Nov. 23, 1965   D. R. PEARL ETAL   3,219,060
HYDRAULIC AMPLIFICATION WITH HYDRAULIC FEEDBACK
Filed Dec. 19, 1962
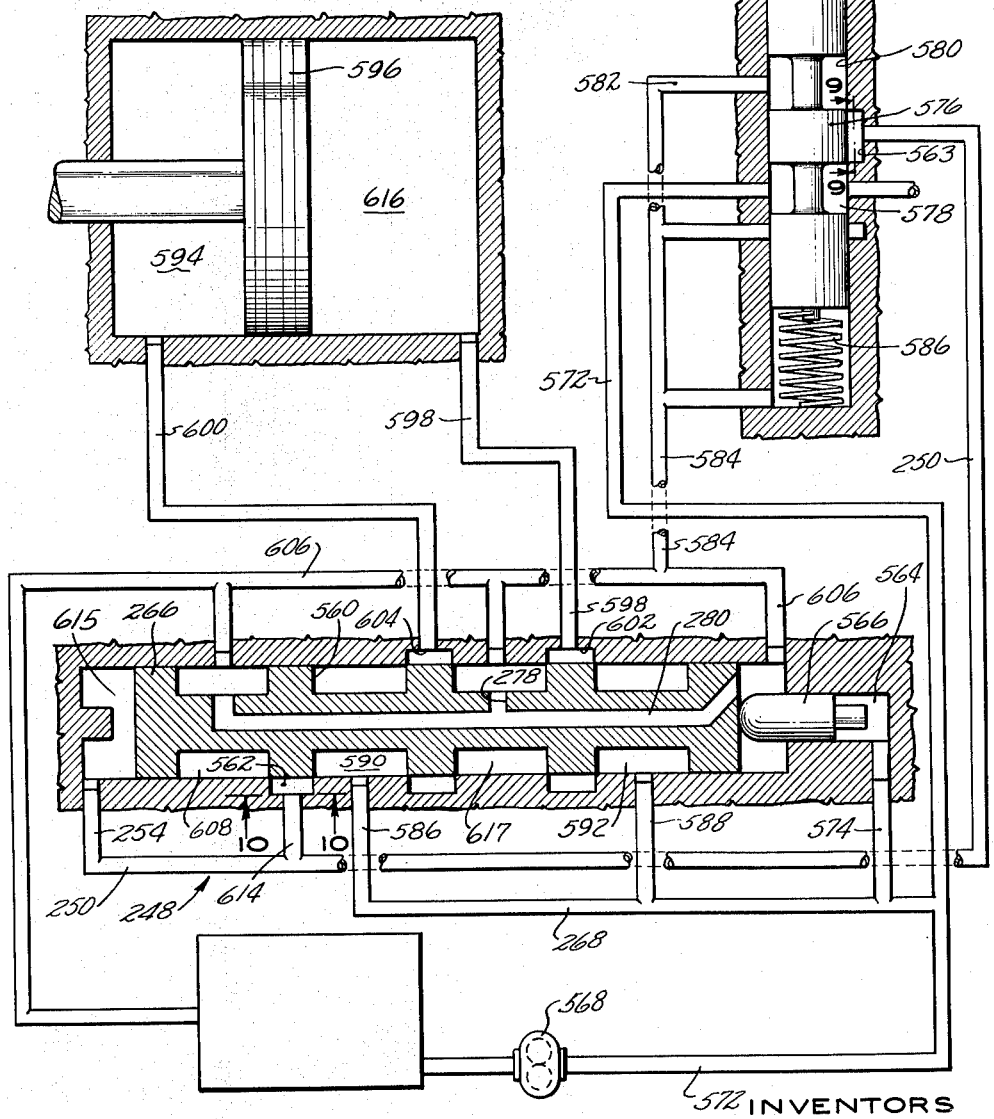
INVENTORS
DAVID R. PEARL
FREDERICK E. SCHEIDLER
BY Norman Friedland
AGENT : 3,219,060
Patented Nov. 23, 1965

1

3,219,060
HYDRAULIC AMPLIFICATION WITH
HYDRAULIC FEEDBACK
David R. Pearl and Frederick E. Scheidler, West Hartford, Conn., assignors to United Aircraft Corporation, East Hartford, Conn., a corporation of Delaware
Filed Dec. 19, 1962, Ser. No. 245,933
7 Claims. (Cl. 137—625.6)

This invention relates to a hydraulic amplification and servo system and more particularly it is a two stage system having hydraulic feedback for positioning a servo valve in accordance with the displacement of control valve.

Generally, two stage servo systems are known in the art and feedback systems are generally known, which will allow a second servo valve to follow a first servo valve. As for example, mechanical feedbacks comprising linkages may be connected to both valves so that the second valve will generate a mechanical signal equivalent to its displacement. Hydraulic feedback systems are also known to accomplish the same function; however, the heretofore known systems are relatively complex. The hydraulic systems are best suited for this particular application since the mechanical system requires linkages and since the valves are remote from each other, these linkages must, by necessity, be large and heavy. We have found that by providing an extra land on the second stage servo valve for conducting high or drain pressure to the servo control chamber of that valve, an extremely simple, yet reliable and accurate servo feedback system is realized.

The time responsiveness and the amplification of the servo system is improved by providing on the first and second stage valves metering ports that bear a particular area relationship to each other.

It is therefore an object of this invention to provide in a hydraulic system as described a hydraulic feedback system that is characterized as being relatively simple, accurate and reliable, yet capable of rugged use.

It still is another object of this invention to provide a hydraulic amplification system with an improved time responsiveness feature.

Other features and advantages will be apparent from the specification and claims and from the accompanying drawings which illustrate an embodiment of the invention.

FIG. 1 is an exploded schematic showing of the first and second stage hydraulic amplification system with the hydraulic feedback.

FIG. 2 is a section taken along line 9—9 of FIG. 1.

FIG. 3 is a section taken along line 10—10 of FIG. 1.

Referring now to the FIGS. 1 to 3 which show the first stage valve 100 and second stage valve 248 and the actuator 18, respectively. It will be appreciated that the first stage valve 100 may be remotely mounted from the actuator 18, and it may be necessary to amplify the input signal so as to obtain sufficient force to move a relatively large actuator. The second stage valve is located at the actuator since it is impractical and inefficient to transmit large amounts of hydraulic flow over the distance involved. Because the second stage valve must respond accurately to the first stage valve, it is necessary to incorporate a suitable feedback. In accordance with this invention, the hydraulic feedback system is utilized to afford the proper feedback function, which system is characterized as being relatively simple. Feedback is effectuated by providing land 560 on spool 266 which cooperates with a slot 562 formed in the valve housing. Valve 248 may be of the half-area type valve such that the area on the left-hand end of spool 266 equals twice the area on the right-hand end. For ease of manufacturing and assembly, the valve is constructed from two pieces, spool 266 and piston 566, but for functionality it can be assumed that the spool is one piece.

2

High pressure generated by pump 568 is supplied to chamber 564 through connecting lines 572 and 574. Servo pressure is introduced into chamber 615 through lines 254 and 250 and this pressure is controlled by metering high pressure fluid by virtue of land 576 formed on spool 102. High pressure fluid is conducted into annulus 578 through line 572 and drain pressure is conducted into annulus 580 through line 582 and line 584. So that it can be seen that upon movement of spool 102 the line 250 will either be communicating with high pressure or drain pressure, depending on the directional movement. Spring 586 is mounted on the underneath side of spool 102 for counter-acting the forces generated by the input signal. This spring merely serves to keep backlash out of the mechanism. Hence, it can be seen from the foregoing that in order to keep the spool 266 on its line-on-line position with the various ports formed in the valve housing, pressure in chamber 615 must be half the pressure within chamber 564. This is apparent because the areas are in the ratio of 2:1. Additional branch lines 586 and 588 interconnect line 268 for conducting high pressure pump fluid into annulus 590 and 592, respectively. Hence it can be seen that upon shifting of the spool in response to a change in pressure the lands formed on spools 266 will uncover a series of ports. Two of these ports communicate with the chambers 616 and 594, formed on either end of the piston 596. Lines 598 and 600 interconnect ports 602 and 604 respectively for conducting the fluid into and out of chambers 592 and 594. Hence upon movement of the spool and assuming such movement to be to the right, ports 604 and 602 become uncovered, allowing high pressure in annulus 590 to communicate with port 604 for conducting high pressure fluid through line 600 to chamber 594; and port 602 becomes uncovered for communicating the pressure in chamber 616 with drain by metering fluid through line 598 and port 602 to annulus 617 through passage 278, through passage 280, and then eventually into drain line 606. Obviously a reversal in direction of movement of spool 266 will communicate chamber 616 with high pressure fluid and chamber 594 with low pressure fluid, hence causing the piston 596 to move in the opposite direction.

As noted in FIG. 1, when the spool 266 moved to the right, it simultaneously uncovered port 562 and opening servo line 250 to drain the annulus 608 and the innerconnecting drain line 614. Obviously to shift the spool 266 to the right, the servo pressure must have increased by virtue of movement of the pilot valve 100. By opening port 562 to drain the valve tends to reduce the pressure in chamber 615 by the interconnection through annulus 608 and through lines 254, 250 and 614. The pressure will continue to reduce until the pressure in chamber 562 equals one-half the pressure in chamber 564. When this occurs, the valve spool assumes a position proportional to the position of valve 100. In the meantime, piston 596 translates at a velocity corresponding to the position of spool 266 until the control system has relayed a feedback signal back to valve 100 to bring it back to its line-on-line position. In this way the servo system has returned to its steady state or equilibrium condition, and will continue to move as described until equilibrium is achieved. Obviously, when the servo pressure from valve 100 decreases, the valve spool 266 moves to the left, land 560 again uncovers port 562 but in the opposite direction for conducting high pressure fluid evidenced in annulus 590 into chamber 615 by way of lines 614, 250, and 254. This high pressure fluid serves to increase the pressure in chamber 615 and when this pressure is equal to one half the pressure in chamber 564, the valve spool position will be proportioned to the position of valve 100 and, as above, piston 596 will translate at a velocity until the control system feedback restores the valve to a null position. When it has reached this line-on-line position, it is apparent from the foregoing that the valve has returned to its steady state condition. Amplification is accomplished in the following manner. The first stage amplification valve 100 serves to sense a relatively low power input signal, transmits that signal to second stage valve 248, which amplifies the signal and generates sufficient force to actuate the piston 596. Amplication is provided by properly sizing slits 562 and 563 (see FIGS. 2, 3). It will be noted that slit 562 is narrower than slit 563, for causing spool 266 to travel a greater distance to uncover the same opening area defined by land 576 cooperating with slit 563. This area matching is required to enable pressure in space 552 to be half of pressure in 564. Hence, from a given input signal the spool 102 will displace a given distance and spool 266 will displace a proportionally greater distance to uncover an opening area defined by land 560 and slit 562 to equal the opening area defined by land 576 and slit 562. Since the slit 562 is narrower than slit 563, spool 266 must travel a greater distance in order to uncover the same area. Hence, for a given signal the spool 266 having to travel a greater distance than spool 102 in response to the signal, will uncover a greater percentage of the port area leading into and out of chambers 592 and 594, respectively, providing a larger capacity of flow into and out of chambers 594 and 592. In this manner, amplification is provided.

It is to be understood that the invention is not limited to the specific embodiment herein illustrated and described, but may be used in other ways without departing from its spirit.

What is claimed:

1. A servo system comprising a source of high pressure fluid and a drain, a first valve having fluid metering means, a second valve having a fluid pressure receiving chamber receiving metered fluid from said fluid metering means, said second valve having an elongated spool having one end disposed in said chamber, a metering land on said spool, a ported housing surrounding said spool with a port registering with said land, means for connect said source of high pressure fluid to one side of said land, means for connecting the other side of said land to said drain, means for providing a relatively constant force on said spool for urging the spool towards said chamber, and a passage for interconnecting said chamber with said port.

2. A servo system according to claim 1 in which the relatively constant force on said spool for urging the spool toward said chamber is provided by a second pressure chamber at the other end of said spool receiving fluid at a relatively constant pressure so as to act against the pressure in the first chamber.

3. A servo system according to claim 2 in which said second spool has one end larger than its opposite end.

4. A servo system comprising, in combination, an actuator, first stage and second stage servo valves for controlling said actuator, said first stage valve having a first housing surrounding a first spool with at least one land for registering with a metering port formed in said housing, said second stage servo valves having a second housing surrounding a second spool, having a second land registering with a second metering port formed in said second housing for metering fluid to said actuator, a pair of chambers formed on either end of said spool, a passage interconnecting said first metering port and one of said chambers, said other chamber continuously receiving high pressure fluid for urging said spool in one direction, the fluid in the other chamber acting on one end of the spool for balancing the forces on said spool to keep the said second land registered with said second port, a hydraulic feedback for assuring said second spool accurately follows said first spool when moved, said feedback including a third land formed on said second spool and registering with a third metering port, additional passage means interconnecting said port and said passage so that said port meters fluid to and from said one chamber for adjusting the pressure therein for assuring that said second spool accurately follows the motion of said first spool.

5. Means for increasing the force amplification of a servo system having a first valve including a first ported housing, a spool in said first housing having a land registering with a first port in said first housing, a second valve including a second ported housing, a second spool in said second housing having a second land, registering with a second port in said second housing, a chamber formed in said second housing adjacent one end of said second spool, a passage interconnecting said first land second port and said chamber for conducting fluid into and out of said chamber, said first area of said first port being larger than the area of said second port, and additional passage means interconnecting said first port and said chamber.

6. Means as claimed in claim 5 wherein said second spool has one end larger than its opposite end.

7. Means as claimed in claim 6 wherein said second housing includes a chamber adjacent the smaller end of said second spool for continuously receiving pressurized fluid.

References Cited by the Examiner

UNITED STATES PATENTS

| | | | |
|---|---|---|---|
| 2,718,877 | 9/1955 | Rishel et al. | 91—216 |
| 2,733,689 | 2/1956 | Badenoch | 91—384 |
| 2,838,910 | 6/1958 | Bacchi | 91—216 X |
| 2,939,651 | 6/1960 | Kaplan et al. | 244—53.8 |
| 2,969,939 | 1/1961 | Sulkin et al. | 244—53.8 |
| 3,067,578 | 12/1962 | Goodall et al. | 244—53.8 X |
| 3,098,412 | 7/1963 | Reitman | 91—216 |

References Cited by the Applicant

UNITED STATES PATENTS

| | | |
|---|---|---|
| 2,904,055 | 9/1965 | Witherall. |

SAMUEL LEVINE, *Primary Examiner.*

ANDREW H. FARRELL, MILTON BUCHLER,
*Examiners.*